J. L. FITTS.
APPARATUS FOR CONTROLLING THE FLOW OF FLUID.
APPLICATION FILED AUG. 13, 1918.
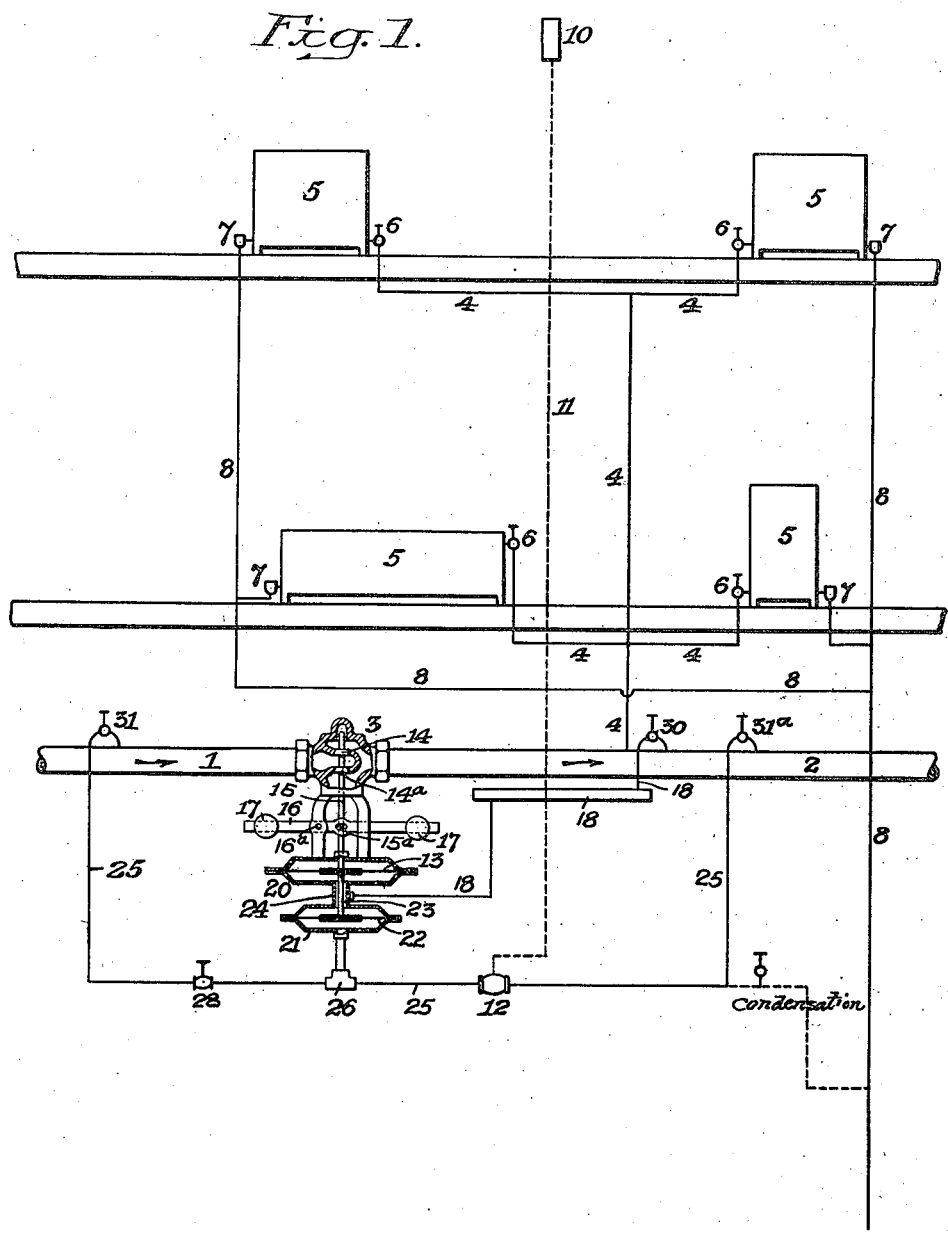

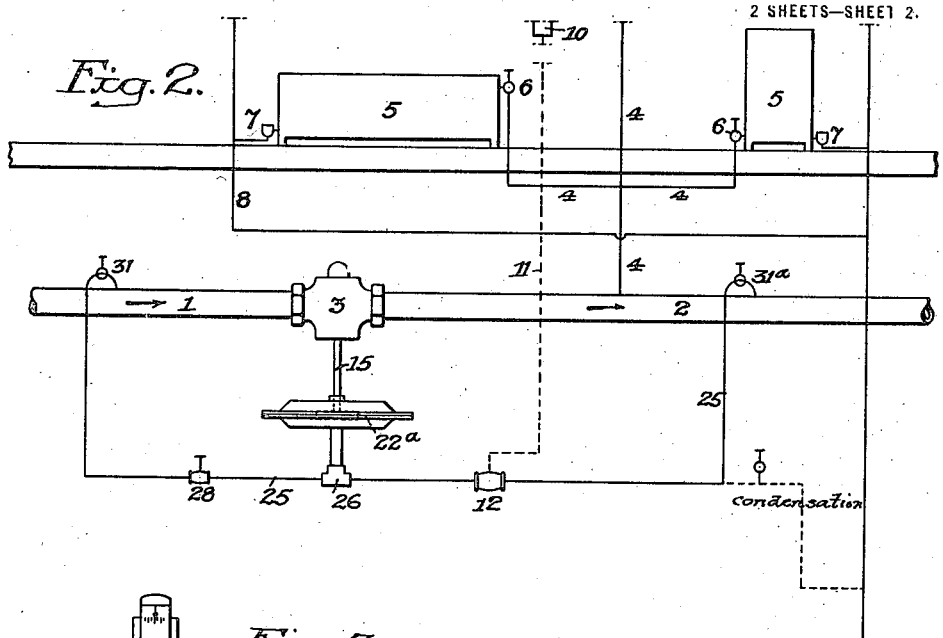
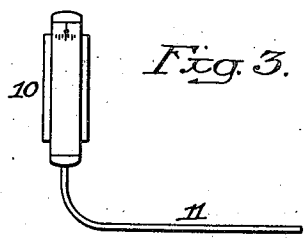
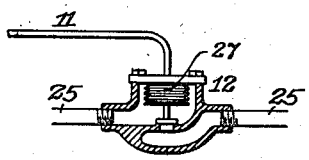
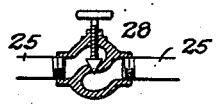
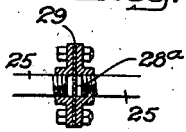

Patented Dec. 5, 1922.

1,438,031

UNITED STATES PATENT OFFICE.

JAMES LOGAN FITTS, OF PENSAUKEN TOWNSHIP, CAMDEN COUNTY, NEW JERSEY, ASSIGNOR TO WARREN WEBSTER & COMPANY, OF CAMDEN, NEW JERSEY, A CORPORATION OF NEW JERSEY.

APPARATUS FOR CONTROLLING THE FLOW OF FLUID.

Application filed August 13, 1918. Serial No. 249,673.

*To all whom it may concern:*

Be it known that I, JAMES LOGAN FITTS, a citizen of the United States, residing in Pensauken Township, Camden County, New Jersey, have invented Apparatus for Controlling the Flow of Fluid, of which the following is a specification.

The object and purpose of my invention is the satisfactory solution of the problem of controlling the temperature in a building at such periods when overheating is serious, and this is effected by the employment of a suitable type of valve at the source of supply; that is to say, a pressure reducing valve, or a special valve located in the main steam line or the line leading from the exhaust of a power unit, in accordance with the general lay-out of the heating system, with co-operating means which make my system a material improvement over those heretofore in use.

It will be understood, of course, that in carrying out my invention, I have utilized various devices more or less commonly employed in systems of the same general character, but so far as I am advised they have never been used in the particular combination or arrangement which I have developed.

These and other features of my invention are more fully described hereinafter, reference being had to the accompanying drawings, in which:

Figure 1, is a diagrammatic view illustrating a typical lay-out of a steam heating system, with supply main, distributing pipes, and radiators; showing also the pressure reducing valve and the operating means therefor, as well as the valves, traps, and condensation receiving pipes employed in connection with the operation of the system.

Fig. 2, is a view illustrating a modified arrangement in which the means for controlling the reducing valve differs from the arrangement illustrated in Fig. 1.

Fig. 3, illustrates diagrammatically a suitable form of thermostat which I may employ with my improved heating system.

Fig. 4, shows a form of valve for control by the thermostat which I may employ, and Figs. 5 and 6, are views illustrating types of valves which may be employed for limiting the flow of steam through the by-pass between the high and low pressure mains.

Referring to the drawings, and more particularly to Fig. 1, 1 is the live steam or high pressure main, 2 the low pressure main, and 3 a special valve interposed between said mains for reducing the pressure and limiting the amount of steam flowing into the low pressure main 2. From the low pressure steam main 2 smaller branches or risers 4 supply radiators 5 with steam. The radiators may be provided with the usual hand operated supply valves 6 and return traps 7 of a type which serve to discharge condensation but retain steam in the radiators, and such parts may be the same as those used in other forms of steam heating systems. The traps 7 discharge into return pipes 8, which may return the condensation water to the boiler, or to any other point desired.

A thermostat 10, which is set to operate at the desired temperature of the air, is located at the place of average temperature and may be of any suitable type, with an operative connection 11 for controlling a valve 12 located relatively as shown. I may employ a form of thermostat in which liquid is used; the expansion or contraction of which, communicated through the connection 11, will close or open the valve 12 to a suitable or desired extent in operation. It will be understood, however, that I may employ a fluid pressure actuated thermostat, or an electrically operated structure, in which instances the connection 11 may be a pipe for conveying air or any other operating fluid, or the usual wires of an electric circuit.

The main steam valve 3 is of the double disk type; being nearly balanced under steam pressure and provided with a flexible diaphragm 13 operatively attached to a pair of valve disks 14 and 14ª by a valve stem 15, with a lever 16, pivoted at 16ª, carrying balance weights 17, and operatively connected to the valve stem 15 at 15ª. The underside of the diaphragm 13 receives pressure from the low pressure steam main 2 through a pipe 18, and when in operation the steam flow is regulated by the pressure in the steam main 2 to close the valve 3 when a predetermined pressure in the main 2 is reached; such pressure varying to a greater or less extent and being dependent upon the relative position of the balancing weights 17 on the lever 16. Under this arrangement the pressure in the pipe 2 is held reasonably constant and sufficiently low for heating purposes.

Below and attached to the underside of the casing 20 containing the diaphragm 13 is another and somewhat smaller diaphragm casing 21, with a diaphragm 22, provided with a rod 23 extending up through the tubular connection 24 and into contact with the underside of the diaphragm 13. The underside of the diaphragm 22 receives pressure through pipe 25 from the high pressure main 1 and is so designed that when said higher pressure is fully maintained against the lower diaphragm 22, the rod 23 is forced upward against the diaphragm 13 and through its connection with the disks 14 and 14ª of the valve 3 above the same, the latter is closed, thereby stopping all flow of steam through the same to the main 2. The pipe 25 may be provided with a T-fitting 26 as shown, for its connection with the diaphragm casing 24, and this pipe is continued to and connected into the steam main 2 on the low pressure side of main valve 3.

The valve 12 is operatively connected through the element 11 with and controlled by the thermostate 10, in such manner that when the temperature at the thermostat falls below a predetermined point the valve 3 will open, permitting steam to pass from the high pressure main 1 through said valve and into the low pressure line 2. The valve 12 may be provided with a flexible diaphragm or an actuating bellows 27, as indicated in Fig. 4.

In the pipe 25 I have placed at 28 what I have termed a "limiting" valve; which may be any ordinary form or type of stop valve, or a cone or needle point type of valve, and its function is to limit the flow of steam through said pipe 25 and valve 12. While I prefer this valve to be adjustable in action, and for such purpose I may employ a valve of the type shown in Fig. 5; an orifice 28ª, of relatively fixed size formed in a metal diaphragm or wall 29, such as shown in Fig. 6, would serve as well for the purpose of preventing a large volume of flow, and yet obtain the desired static pressure to affect the diaphragm 22. The pipe 18 is preferably provided with a valve 30 adjacent its connection with the low pressure main 2, and the pipe 25 may be valved at 31 and 31ª at its connections with the high and low pressure mains 1 and 2, respectively.

In the arrangement shown in Fig. 2, I have shown the pressure reducing valve 3 as controlled by a single diaphragm 22ª, open to pressure from the by-pass 25 disposed between the high pressure main 1 and the low pressure main 2. In this instance, the stem 15 carrying the valve disks 14 and 14ª may be connected to said diaphragm 22ª, and the latter, under the influence of pressure from said by-pass, will tend to keep said valve disks in the closed position. Should the temperature adjacent the thermostat lower, however, the valve 12 will be opened by the action of said thermostat; thereby reducing the pressure on said diaphragm 22ª, and the valve disks 14 and 14ª will open to an extent sufficient to supply the low pressure main 2 with the desired supply of steam from the high pressure main 1 necessary for passage to the various radiators or other heating elements.

The operation of my improved system is as follows:

Starting with the building cold, below the desired temperature, steam will be supplied at the higher pressure from the main 1 on the inlet side of the valve 3 and with the lever weights (when used) so placed that said valve is open so that steam may pass through the same and into the low pressure steam main 2, and thence through the risers 4 to the various radiators 5 in the building.

The temperature being below that desired at the location of the thermostat 10, the valve 12 controlled by the thermostat is open and steam is passing through pipe 25, limited in flow by valve 28, into the low pressure main 2. This relative action will continue so long as the steam pressure in the low pressure main is such that the building is not overheated nor heated to the temperature at which the thermostat 10 will operate.

When the need for steam for supplying radiation is reduced, due to the warming up of the rooms or building, the pressure in steam main 2 will rise and this pressure passing through pipe 18 will act upon the diaphragm 13 and close off or throttle the steam flow through main valve 3. Usually as the demand for heat varies from zero to 100%, it is probable that the pressure in the low pressure main 2 will not build up to such a point that the valve 3 will close tight, then considerable heat will be given off by the radiation, unless individual radiators are shut off, and overheat the building. This being the case should the heat of the air at the thermostate 10 become, say, 68° F. or any other equable temperature for which it is set to operate, then its operation will close valve 12 in pipe 25, stopping the flow of steam and allow a building up of the pressure under diaphragm 22 sufficient to cause it to actuate the upper diaphragm 13 and close the main valve 3, thus stopping all further steam flow through and into low pressure main 2.

It will be understood that the limiting valve 28 or its equivalent is intended to restrict the volume of steam flow through pipe 25, and closure of valve 12 by the action of the thermostat 10 will allow full pressure in main 1 to act upon the diaphragm 22 and said diaphragm 22 is intended to be proportioned to withstand the higher pressure in main 1 with safety.

Should the temperature fall below that desired at the location of the thermostat 10, the valve 12 will open and relieve the pressure in pipe 25 and under the lower diaphragm 22 and permit it to pass into the low pressure main 2. The upper diaphragm 13 will fall due to the weights 17 on the lever 16 being in excess of the force due to any remaining pressure and there being practically no pressure and even a partial vacuum in main 2 operating through pipe 18, the main valve 3 will open and permit full admission of steam in large volume to the whole heating system under this control.

The operation of the system illustrated in Fig. 2, is substantially like that illustrated in Fig. 1, excepting that the disks 14 and 14ª of the valve 3 will be directly controlled by the diaphragm 22ª without the use of counterbalancing weights or the lower diaphragm.

It is evident that this apparatus, as before stated, is suitable for use with large or small systems; the capacity of the main valve 3 being proportioned to the service anticipated and desired. Also, that relative variations in initial and terminal pressures in the main in which the steam valve 3 is placed may be desirable, which are readily met by making the areas of the diaphragms 13 and 22 of proper relative size, with lever 16 and weights 17 proportioned thereto when such arrangement is employed, or by proper throttling of the by-pass when a single diaphragm is used.

While I have described my invention as particularly adapted for use in connection with steam heating apparatus, it will be understood that with or without modification within the scope of my invention it can be employed with so-called vapor heating apparatus, and the claims are intended to be broad enough to cover such arrangement.

It will be understood, of course, that changes may be made in the various details of construction without departing from my invention, and that while definite embodiments of the system forming the subject of my invention have been shown in the accompanying drawings and described with more or less particularity, I do not wish to be limited to the precise construction or arrangement disclosed; desiring to claim any equivalent construction or arrangement capable of performing the function for which the improved system or method of heat control for buildings constituting my particular invention has been designed.

I claim:

1. Means for controlling the flow of fluid comprising high and low pressure mains, a valve between said mains, two diaphragms operatively connected to said valve, a by-pass between the mains connected to deliver fluid to one of the diaphragms, a connection from the low pressure main for delivering fluid to the other diaphragm, and a thermostat controlling the pressure of fluid in the by-pass.

2. Means for controlling the flow of fluid comprising a high and low pressure main; a valve between said mains; a diaphragm controlling said valve and responsive to changes of fluid pressure from the low pressure main; a second diaphragm connected to the high pressure main and mounted to act against the first diaphragm; a thermostat controlling the pressure of fluid operative on the second diaphragm, and means for limiting the pressure of the fluid acting on said second diaphragm.

3. Means for controlling the flow of fluid consisting of high and low pressure mains, a balanced valve connected between said mains, a diaphragm for controlling the position of said valve and connected to the low pressure main, a second diaphragm mechanically operative on the first diaphragm, a connection from the high pressure main to the second diaphragm, means for regulating the pressure in said connection, and a thermostat for controlling the pressure of fluid operative on the second diaphragm.

J. LOGAN FITTS.